Aug. 24, 1965 J. STARK, JR 3,202,865

REGULATED HIGH VOLTAGE SUPPLIES FOR COLOR TELEVISION TUBE

Filed March 8, 1963 2 Sheets-Sheet 1

INVENTOR.
JOHN STARK, JR.
BY
[signature]
ATTORNEY

Aug. 24, 1965 J. STARK, JR 3,202,865

REGULATED HIGH VOLTAGE SUPPLIES FOR COLOR TELEVISION TUBE

Filed March 8, 1963 2 Sheets-Sheet 2

INVENTOR.
JOHN STARK, JR.
BY
W. H. Spouagle
ATTORNEY

United States Patent Office 3,202,865
Patented Aug. 24, 1965

3,202,865
REGULATED HIGH VOLTAGE SUPPLIES FOR COLOR TELEVISION TUBE

John Stark, Jr., Indianapolis, Ind., assignor to Radio Corporation of America, a corporation of Delaware Filed Mar. 8, 1963, Ser. No. 263,785
5 Claims. (Cl. 315—22)

Figure 1:
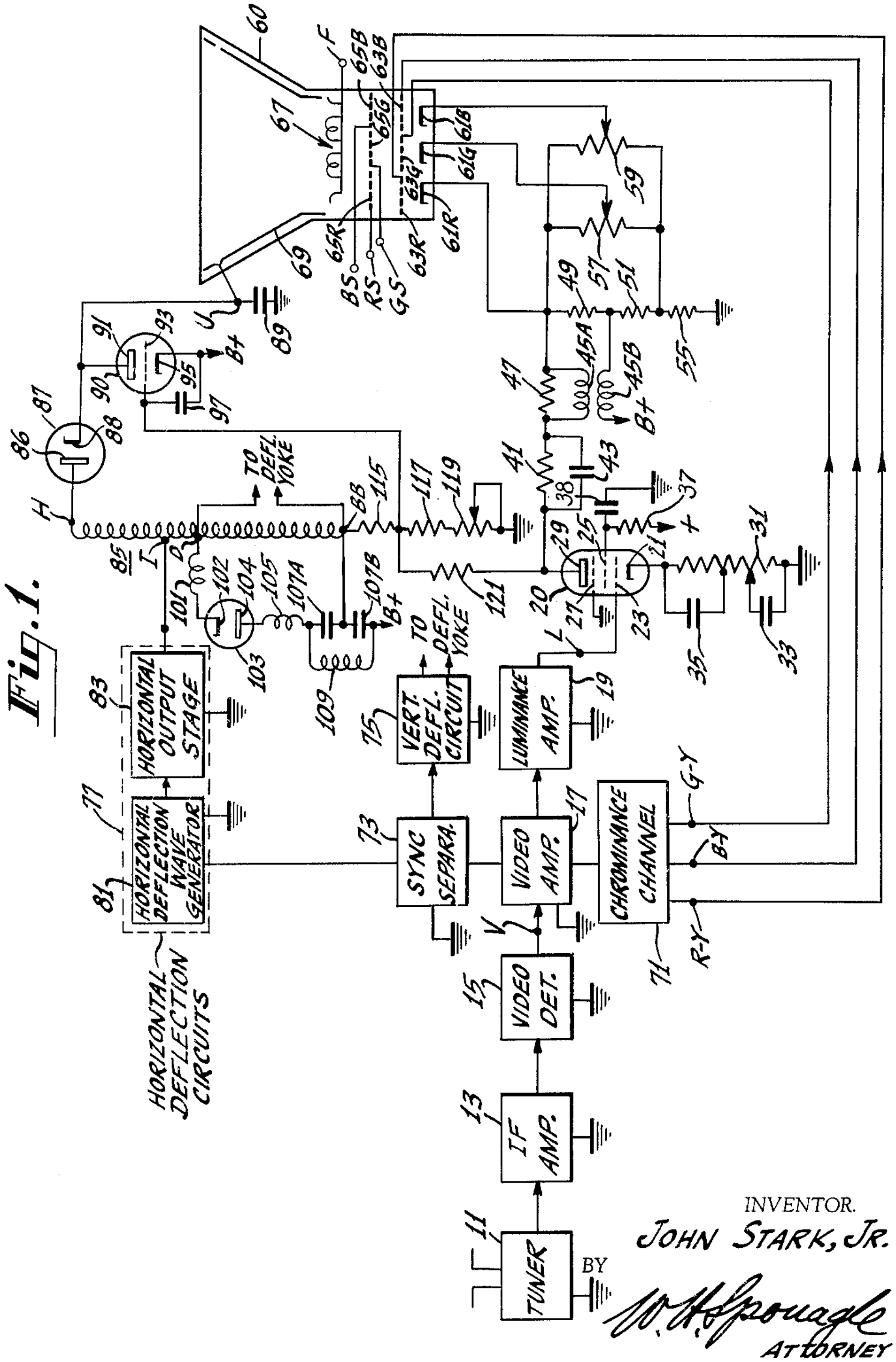

This invention relates generally to high voltage supplies, and more particularly, to high voltage supplies of the regulated type, such as, for example, the regulated high voltage supplies employed to satisfy the high voltage requirements of the color image reproducer in a color television receiver.

A conventional form for the color image reproducing device of a color television receiver is that of the three-gun, shadow mask color kinescope. Such a color kinescope includes a final accelerating or ultor electrode which effects final acceleration of the scanning beams produced by the kinescopes' three electron guns. The operating voltage requirement for the ultor electrode in such a kinescope is relatively high, being of the order, for example, of 24 kv.

While voltages of comparable magnitude are also nominally required for the final accelerating electrode of monochrome kinescopes, a considerable degree of variation in the value of the electrode potential (with loading, for example) is tolerable in use of the monochrome kinescope. This is not true, however, in use of a color kinescope where variations in the final accelerating electrode potential would have certain adverse effects on operations such as beam convergence, which involve problems not found in the use of the monochrome kinescope. Accordingly, whereas monochrome television receivers operate satisfactorily with unregulated high voltage supplies, it has been found necessary to go to the expense of providing a regulated high voltage supply in the usual color television receiver.

In the RCA CTC–12 color television receiver chassis described in the RCA Service Data Pamphlet designated 1962 No. T6, a high voltage supply is employed using a triode in shunt with the kinescope load as a voltage regulating device. A sample of the high voltage output variations is obtained from a voltage divider across the receiver's B-boost voltage supply circuitry. As discussed in greater detail in U.S. Patent 2,785,336, issued on March 12, 1957, to John A. Konkel and John Stark, Jr., the B-boost potential developed in a color television receiver accurately reflects any variations in the receiver's high voltage output due to loading changes or the like. The B-boost potential sample is applied to the control grid of the regulator triode to appropriately alter the regulator space current in a direction opposing the high voltage change. The general effect is such that, when the kinescope current increases (thus tending to depress the high voltage output), the regulator space current decreases (tending to cause an opposing change in the high voltage output); conversely, when the kinescope current decreases, the regulator space current increases, whereby to maintain the high voltage output substantially constant.

While the above described voltage regulating arrangement is successful in maintaining the high voltage output substantially constant over a wide range of kinescope current values, it will be appreciated that the described system inherently contemplates some variation in the output voltage over the range of regulation; i.e., its operation depends on the existence of an "error" voltage, whereby the regulator space current may be maintained at the appropriate compensating level. If the high voltage output (as reflected in the B-boost voltage value) were not off its kinescope-blanked value when the kinescope is drawing high current, the grid voltage on the regulator tube would not effect the reduction in regulator space current (relative to the current drawn thereby under kinescope-blanked conditions) required for compensation in the high kinescope current situation. As a result in a high voltage regulating arrangement of the described type, where under kinescope-blanked conditions the high voltage output is at a 24 kv. value, for example, the high voltage output may drop as low as approximately 23 kv. at the opposite end of the regulator control range.

The present invention is directed to an improved regulated high voltage supply in which the sag in high voltage output with increased kinescope current, as described above, may be avoided, whereby the high voltage output values at both ends of the regulator control range may be made substantially equal. In accordance with the principles of the present invention, this result is achieved by providing supplemental control information for the regulator device in addition to the usual loading-responsive voltage sample. In accordance with a particular embodiment of the present invention, this supplemental control information comprises information relative to the D.C. content of the luminance signal being fed to the color image reproducer, and is derived via D.C. coupling to a load of a video amplifier in the receiver's luminance signal channel.

By virtue of the use of the supplemental control information contemplated by the present invention, the usual sagging regulation characteristic of the color television receiver's high voltage supply may be supplanted by such a regulation characteristic as to insure obtaining of the same high voltage output under conditions of both maximum and minimum regulator space current. If so desired, the principles of the present invention may be employed to obtain a higher level of high voltage output for conditions of minimum regulator space current than that obtained under conditions of maximum regulator space current.

Accordingly, a primary object of the present invention is to provide a novel and improved regulated high voltage supply.

An additional object of the present invention is to provide a color television receiver with an improved regulated ultor supply capable of maintaining substantially the same ultor voltage at high levels of ultor current as is obtained at minimum ultor current.

Figure 2:
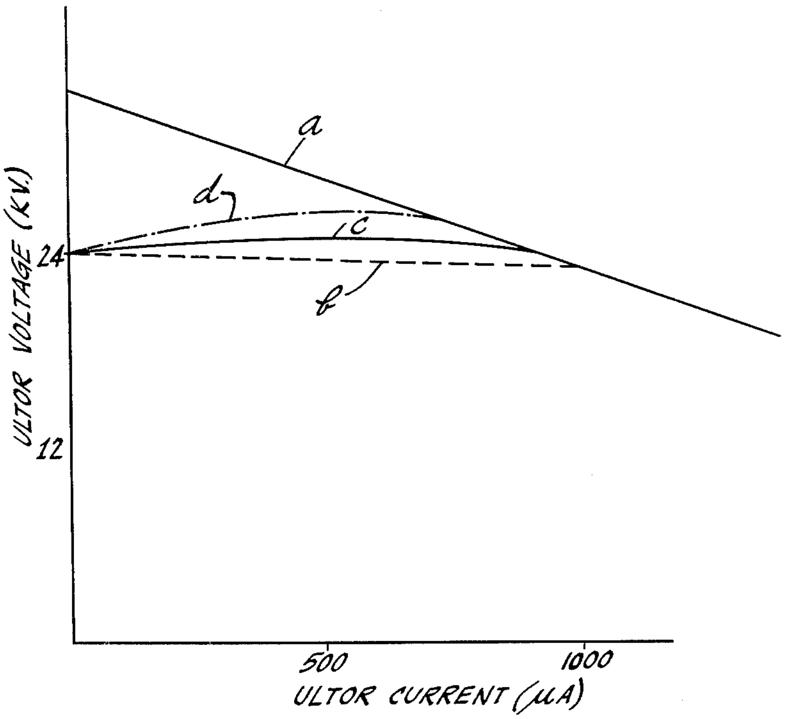

Other objects and advantages of the present invention will be readily apparent to those skilled in the art upon the reading of the following detailed description and an inspection of the accompanying drawing in which:

FIGURE 1 illustrates in a diagram, partially schematic and partially of block diagram form, a color television receiver incorporating an embodiment of the present invention; and FIGURE 2 illustrates graphically high voltage regulation characteristics of aid in explaining the operation and advantages of the invention embodiment of FIGURE 1.

FIGURE 1 illustrates a color television receiver, shown generally in block diagram form, with a color kinescope 60 and certain associated receiver portions shown in schematic detail, demonstrating applications of the principles of the present invention to the receiver's high voltage supply. The receiver is shown with a conventional head end line up of tuner, intermediate frequency amplifier and video detector. The tuner 11 serves to convert received signals to an intermediate frequency range falling within the pass band of the succeeding intermediate frequency amplifier 13. The output of amplifier 13 is applied to a video detector 15, which recovers from the intermediate frequency signal a composite color video signal, which appears at the video detector output terminal V.

The video signals appearing at terminal V are supplied to a video amplifier 17 for amplification and delivery to a plurality of utilization channels. One output of the video amplifier 17 is fed to a sync separator 73, which serves to separate the deflection synchronizing component of the composite video signal from the remainder thereof, in order to effect synchronization of the receiver's vertical and horizontal deflection circuits, 75 and 77, respectively. The output of the vertical deflection circuits 75 is supplied to the vertical windings of a deflection yoke (not illustrated), associated with the color kinescope 60 for the usual beam deflection purposes.

The horizontal deflection circuits 77 are illustrated as incorporating a horizontal deflection wave generator 81 driving a horizontal output stage 83. The horizontal scanning wave output of the stage 83 is delivered to the horizontal windings of the kinescope's deflection yoke via a horizontal output transformer 85, illustrated schematically. The output transformer 85 provides an autotransformer form of coupling between the output of stage 83 and the yoke. The output of stage 83 appears across a primary winding portion of transformer 85 extending from an intermediate intput terminal I to a ground return terminal BB. A section of the I-BB winding portion serves as the autotransformer secondary winding across which the deflection yoke is coupled. This secondary winding section extends from terminal BB to a tap D positioned between the terminals I and BB. Also coupled across this secondary winding section is damper circuitry comprising, in series, choke 101, damper diode 103, choke 105, and capacitor 107A (shunted by linearity coil 109 in series with capacitor 107B).

The function of the damper tube 103 in effecting reaction scanning, and power recovery of the conventional B-boast type, is well known to those skilled in the art and need not be explained in detail herein. It should be sufficient to note that negative swings of the voltage wave across the windings of the transformer 85 during successive scanning retrace intervals are rectified by the damper tube 103, developing a charge on capacitors 107A and 107B in a direction adding to the B+ voltage, (applied to the damper tube anode 104 via the linearity coil 109) to develop an augmented B+ voltage, conventionally called a B-boost voltage, at the terminal BB. The development of the B-boost voltage, in addition to improving the efficiency of the horizontal output stage 83, provides a voltage source subject to a plurality of utilizations at various points in the receiver.

For simplicity of illustration, only one of the utilizations of the B-boost voltage has been illustrated in FIGURE 1, viz. the utilization of the B-boost voltage as a control voltag for a high voltage regulator tube 90. To appreciate the function of regulator tube 90, it is in order to consider the high voltage circuitry of the illustrated receiver. The color kinescope 60 is shown as incorporating a final accelerating or ultor electrode 69, which, in its usual form, comprises a conductive coating on the inner surface of the kinescope bulb extending from the deflection yoke region to the screen region of the color kinescope. The high operating voltage required by the ultor electrode 69 is satisfied by a high voltage rectifier diode 87, which rectifies a stepped up flyback pulse output of the transformer 85 to develop a high unidirectional potential. The high potential output of rectifier 87 appears across a high voltage capacitor 89, coupled between the rectifier cathode 88 and chassis ground. A grounded conductive coating on the outer surface of the flared bulb portion of kinescope 60 usually serves to form the high voltage capacitor 89 in cooperation with the inner conductive coating that makes up the ultor electrode 69.

The transformer 85 includes a high voltage tertiary winding extending from a high voltage pulse output terminal H to the previously mentioned input terminal I. Autotransformer step-up of the flyback pulses is thereby provided, the I-BB winding portion serving as the autotransformer primary, and the full H-BB winding serving as the autotransformer secondary. The high voltage rectifier anode 86 is directly connected to pulse output terminal H.

The current drawn by the kinescope ultor electrode 69 varies with the signals driving the kinescope, and, in particular, with the driving signal representative of the luminance of the image to be displayed. The range of variation extends from cut-off to heavy conduction, and as a result the kinescope presents a highly variable load on the high voltage rectifier 87. In the absence of some dynamic regulating effort, the ultor voltage would be subject to wide variation in accordance with the loading changes. This is particularly intolerable for a color kinescope, since such ultor voltage variations would not only affect picture brightness and deflection raster size, but would also have a serious adverse effect on the convergence of the multiple beams of the kinescope.

Accordingly, the high voltage supply of the illustrated receiver is provided with a shunt regulator utilizing triode 90 as the active regulating device. The anode 91 of the regulator triode is directly connected to the rectifier output electrode, cathode 88. The cathode 95 of the regulator triode is directly connected to the receiver's B+ supply (not illustrated). The control grid 93 of the regulator triode is connected to a tapping point on a voltage divider coupled across the receiver's B-boost voltage source. The voltage divider comprises the series combination of a first fixed resistor 115, a second fixed resistor 117, and an adjustable resistor 119. The resistor 115 is connected between the terminal BB of output transformer 85 and one end of resistor 117; the adjustable resistor 119 is connected between the opposite end of resistor 117 and chassis ground. The junction between resistors 115 and 117 comprises the voltage divider tapping point to which the regulator control grid 93 is directly connected. A bypass capacitor 97 is coupled between the control grid and cathode of the regulator triode 90.

The B-boost voltage developed at terminal BB, and appearing across the voltage divider 115–117–119, varies with the kinescope loading changes in the same direction as the unregulated high voltage rectifier output would vary. That is, as the kinescope loading increases with ultor current, the B-boost voltage tends to decrease (i.e., become less positive relative to chassis ground); conversely, decreases in ultor current cause the B-boost voltage to rise (i.e., become more positive relative to chassis ground). By virtue of the connection of control grid 93 to the B-boost voltage divider, the control grid-cathode voltage of triode 90 varies with ultor current variations such as to cause the triode to draw more current when the kinescope draws less, and to draw less current when the kinescope draws more. The general effect is to present a substantially constant load to the high voltage rectifier 87, whereby wide variations in the kinescope ultor current do not cause wide variations in the output voltage of the high voltage rectifier.

FIGURE 2 illustrates graphically changes in ultor voltage with changes in ultor current under a variety of circumstances. Curve *a* of FIGURE 2 is illustrative of the ultor voltage changes when the receiver's high voltage supply is unregulated (e.g., if regulator triode 90 is removed from the illustrated circuit). As FIGURE 2 shows, the ultor voltage, under such conditions, decreases continuously and rather sharply from a maximum value at zero ultor current. Over a range of ultor current values from zero to 1,000 microamperes, the ultor voltage change of the unregulated voltage supply is seen to be of the order of 10,000 volts.

Curve *b* of FIGURE 2 is illustrative of the effect of utilizing regulator 90 with control thereof by the above-described B-boost voltage sampling technique. As FIGURE 2 shows, the reduction in ultor voltage swing with such regulator utilization is marked; the ultor voltage is still decreasing continuously from a maximum at zero ultor current, but the magnitude of the ultor voltage swing is quite significantly lessened. In the illustrated example, the ultor voltage swing is from a value of 24 kv. at zero ultor current to a value of approximately 23 kv. at 1,000 microamperes of ultor current.

However, while the B-boost voltage sampling technique effects the significant regulation improvement noted above, there still exists a residual decrease in ultor voltage with increase in ultor current, which in the illustrative example amounts to a change of the order of 1,000 volts over the zero to 1,000 microamperes ultor current range. The steady decrease will be seen to be inherent in the regulation scheme employed. Achievement of the desired effects on the regulator device (triode 90) by the sampling of the loading-responsive B-boost voltage source demands the presence of an "error voltage."

The present invention is directed to an improvement in the above-described voltage regulating arrangement whereby the noted sag in ultor voltage may be avoided, at least over a substantial portion of the regulating range. In accordance with the principles of the present invention, the previously discussed B-boost voltage sampling technique is supplemented by the imposition of an additional control voltage from a separate control voltage source. This separate control voltage source is one which is indicative of the cause of the kinescope loading changes, in contrast with the effect or result thereof. The kinescope loading changes are primarily caused by variations in the luminance signal drive applied to the color kinescope 60, and, in particular, the D.C. component of such luminance signal drive. The present invention supplements the B-boost voltage sample applied to the regulator control grid with a control voltage representative of the D.C. component of the luminance signal drive to the color kinescope. An example of the effect of this control voltage supplementation is shown by curve *c* of FIGURE 2. In contrast with the sagging characteristic illustrated by curve *b*, curve *c* shows maintenance of the ultor voltage at the same or higher level as the zero ultor current value, over a wide range of ultor current values.

To appreciate how control voltage supplementation suitable for producing the characteristic of curve *c* can be effected, one should now consider in more detail the additional utilizations of the output of the video amplifier 17 of FIGURE 1. In addition to the previously described synchronizing channel utilization of the video amplifier 17 output, a luminance amplifier 19 and a chrominance channel 71 are each caused to respond to the amplifier 17 output.

The chrominance channel 71 shown only in block form, may comprise the usual circuitry associated with proper recovery of color-difference signal information from the modulated color subcarrier which is a component of the composite color video signal recovered by detector 15. Such circuitry generally comprises a bandpass amplifier for selectively amplifying the color subcarrier and its side bands, a suitable array of synchronous detectors for demodulating the color subcarrier, and matrix circuits for suitably combining the detector outputs to obtain a set of color-difference signals of the appropriate form for application to the respective electron guns of the color kinescope 60. To effect the desired synchronous detection of the color subcarrier, there will be associated with the chrominance channel a local source of oscillations of subcarrier frequency and reference phase, as well as means for phase synchronizing this local oscillation source in accordance with the reference information of the burst component of the composite color video signal.

The red, blue and green color-difference signal outputs of the chrominance channel 71 appear at respective output terminals R–Y, B–Y and G–Y, which are directly connected to the respective control grids, 63R, 63B and 63G of the red, blue and green electron guns of the color kinescope 60.

This color difference signal drive of color kinescope 60 is complemented by the application of a common luminance signal to the respective cathodes 61R, 61B and 61G of the electron guns. Delivery of the luminance signal to the kinescope cathodes is achieved by the coupling of a luminance amplifier 19 to receive an output of video amplifier 17, and the provision of a luminance output stage, responding to the signals appearing at the luminance output terminal L of amplifier 19. The illustrated luminance output stage comprises a pentode 20, including a cathode 21, control grid 23, screen grid 25, suppressor grid 27 and anode 29.

The cathode 21 is returned to chassis ground through the resistive element of a potentiometer 31, which serves as the receiver's contrast control. The adjustable tap of potnetiometer 31 is coupled to chassis ground via a large bypass capacitor 33. For frequency response compensation purposes, a portion of the potentiometer's resistive element remote from chassis ground is shunted by a capacitor 35. The control grid 23 of pentode 20 is connected to the luminance amplifier 19 output terminal L. The screen grid 25 is returned to a source of positive operating potential via a dropping resistor 37, bypassed to ground by capacitor 38. The suppresor grid 27 of pentode 20 is directly returned to chassis ground.

A positive operating potential (from the receiver's B+ supply )is supplied to the anode 29 of pentode 20 by a path comprising shunt peaking coil 45B, video load resistor 49, series peaking coil 45A (shunted by resistor 47), and parallel RC network 41–43. The series and shunt peaking coils 45A and 45B are mutually inductively coupled to enhance the peaking effect provided thereby. The luminance signal developed across video load resistor 49, and appearing at the junction of resistor 49 and series peaking coil 44A is directly applied to the cathode 61R of the red electron gun of color kinescope 60.

The junction between video load resistor 49 and the shunt peaking coil 45B is returned to ground via the series combination of resistors 51 and 55. The resistive elements of a pair of potentiometers 57 and 59 are each connected between the red cathode 61R and the junction between resistors 51 and 55. The adjustable taps of the potentiometers 57 and 59 are respectively connected to the greeen gun cathode 61G and the blue gun cathode 61B. These potentiometers serve the function of providing means for adjusting the relative luminance signal drive of the three electron guns of color kinescope 60. Such adjustment is made, for example, during set up of the receiver in order to achieve reproduction of white portions of the picture at the proper color temperature.

The D.C. component of the luminance signal, driving the cathodes of the three kinescope guns in common, varies in accordance with picture content. Such D.C. component variations constitute the primary cause of the changes in kinescope loading.

The present invention utilizes this relationship between luminance D.C. component variations and kinescope loading changes by applying a sample of the luminance D.C. component to the control grid 93 of the regulator tube 90, in addition to the B-boost voltage sample applied thereto. For this purpose, a resistor 121 is directly connected between the anode 29 of the luminance amplifying tube 20 and the regulator control grid 93. The bypass capacitor 97, coupled between control grid 93 and the regulator cathode 95, bypasses the video frequency variations in the applied luminance signal sample, leaving the control grid 93 responsive only to the D.C. component of the sample.

It will be seen that resistors 117 and 119 form with the luminance coupling resistor 121 a voltage divider of the luminance signal. The relative contributions of the respective B-boost voltage and luminance D.C. component samples to control of the regulator 90 is determined by choice of the relative values of the two coupling resistors 115 and 121. Curve *c* of FIGURE 2 is illustrative of the results achieved when the contribution by the luminance D.C. component sample is chosen to be just sufficient to result in the same ultor voltage at the minimum regulator current end of the regulator control raange as is obtained at the minimum ultor current end of the range. While this would appear to be the optimum choice of the relative contributions, it should be noted that the contribution of the luminance D.C. component sample may be made even greater, with results as illustrated by curve *d* of FIGURE 2. Under the latter condtions, the ultor voltage actually rises to a higher level at the minimum regulator current end of the regulator control range than is obtained at the minimum ultor current end of the range.

It should be appreciated that minimum regulator current occurs when the positive potential on control grid 93 drops sufficiently low to cut off space current flow in the regulator tube 90. When this condition is reached, further drops in the control grid voltage can have no further altering effects on the regulator current flow, and, accordingly, the ultor voltage thereafter follows the unregulated supply curve *a*.

A set of parameter values for the circuitry of FIGURE 1 which has provided satisfactory operation is set forth in the table below. It should be appreciated that this particular set of values is given by way of example only:

| | | |
|---|---|---|
| Potentiometer 31 | ohms | 368 |
| Resistor 37 | do | 22,000 |
| Resistor 41 | do | 2,700 |
| Resistor 47 | do | 18,000 |
| Resistor 49 | do | 5,600 |
| Resistor 51 | do | 6,800 |
| Resistor 55 | do | 39,000 |
| Potentiometers 57, 59, each | do | 6,000 |
| Resistor 115 | megohms | 1.5 |
| Resistor 117 | do | 1.5 |
| Resistor 119 | ohms | 500,000 |
| Resistor 121 | megohms | 12 |
| Capacitor 33 | microfarads | 50 |
| Capacitor 35 | do | 2,200 |
| Capacitor 38 | do | .22 |
| Capacitor 43 | do | 1,000 |
| Capacitor 97 | do | .01 |
| Capacitor 107A | do | .068 |
| Capacitor 107B | do | .082 |
| Pentode 20 | | 12BY7A |
| Diode 87 | | 3A3 |
| Triode 90 | | 6BK4 |
| Diode 103 | | 6DW4 |

What is claimed is:

1. In a television receiver including a cathode ray tube having a final accelerating electrode and a beam intensity control electrode, said receiver also including a source of video signals coupled to said beam intensity control electrode,
   - a regulated high voltage supply for delivering an operating voltage to said final accelerating electrode, said supply comprising the combination of;
   - a high voltage rectifier having an output electrode directly connected to said final accelerating electrode;
   - a regulator tube having a space current path connected between said rectifier output electrode and a point of reference potential, said regulator tube also having a control electrode;
   - a control voltage source responsive to changes in the loading on said high voltage rectifier presented by said cathode ray tube;
   - means for varying the potential on said control electrode of said regulator tube in accordance with the output of said loading-responsive control voltage source;
   - and means for additionally rendering the potential of said control electrode of said regulator tube responsive to the output of said video signal source.

2. In a television receiver including a cathode ray tube having a final accelerating electrode and a beam intensity control electrode, said receiver also including a source of video signals, inclusive of a D.C. component, coupled to said beam intensity control electrode.
   - a regulated high voltage supply for delivering an operating voltage to said final accelerating electrode, said supply comprising the combination of;
   - a high voltage rectifier having an output electrode directly connected to said final accelerating electrode;
   - a regulator tube having a space current path connected between said rectifier output electrode and a point of reference potential, said regulator tube also having a control electrode;
   - a control voltage source responsive to changes in the loading on said high voltage rectifier presented by said cathode ray tube;
   - means for varying the potential on said control electrode of said regulator tube in accordance with the output of said load-responsive control voltage source;
   - means for coupling said control electrode of said regulator tube to said video signal source;
   - and filtering means associated with said last named coupling for rendering said control electrode substantially insensitive to variations in the output of said video signal source other than the D.C. component variations thereof.

3. In a television receiver including a kinescope having a final accelerating electrode and a beam intensity control electrode, said receiver also including a source of video signals coupled to said beam intensity control electrode, and deflection circuitry including a B-boost voltage source;
   - a regulated high voltage supply comprising the combination of:
   - a high voltage rectifier having an output electrode directly connected to said final accelerating electrode;
   - a regulator tube having an anode connected to said rectifier output electrode, and a cathode connected to a point of reference potential, and also having a control grid;
   - means for rendering the potential on said control grid responsive to variations in the output of said B-boost voltage source;
   - and means for additionally rendering the potential on said control electrode of said regulator responsive to the output of said video signal source.

4. In a color television receiver including a color kinescope having an ultor electrode and a plurality of cathode electrodes, said receiver also including a source of video signals, inclusive of a D.C. component, coupled to said plurality of cathode electrodes, and deflection circuitry including means for developing a B-boost potential responsive to variations in ultor current;
   - a regulated high voltage supply comprising the combination of:
   - a high voltage rectifier having an output electrode connected to said ultor electrode;
   - a regulator tube having an anode connected to said rectifier output electrode, and a cathode connected to a point of reference potential, said regulator tube also having a control grid;
   - means coupled to said deflection circuitry for varying the potential on said control grid in accordance with variations in said B-boost potential;
   - means for additionally coupling said control grid to said video signal source;
   - and filtering means associated with said last named coupling means for rendering said control grid substantially insensitive to variations in the output of said video signal source other than the D.C. component variations thereof.

5. In a color television receiver including a color kinescope having an ultor electrode and a plurality of cathode electrodes, said receiver also including a source of video signals, inclusive of a D.C. component, coupled to said plurality of cathode electrodes, and deflection circuitry including means for developing a B-boost potential responsive to variations in ultor current;

a regulated high voltage supply comprising the combination of:

a high voltage rectifier having an output electrode connected to said ultor electrode;

a regulator tube having an anode connected to said rectifier output electrode, and a cathode connected to a point of reference potential, said regulator tube also having a control grid;

means coupled to said deflection circuitry for varying the potential on said control grid in accordance with variations in said B-boost potential whereby, in the absence of any additional control of said regulator tube, the output of said high voltage supply is regulated in accordance with an ultor current-ultor voltage regulation characteristic of a predetermined shape;

and additional regulator tube control means for causing the output of said high voltage supply to be regulated in accordance with an ultor current-ultor voltage regulation characteristic departing from said predetermined shape;

said additional regulator tube control means comprising means coupled to said video singal source for additionally varying the potential on said control grid in accordance with variations of said D.C. component.

References Cited by the Examiner

UNITED STATES PATENTS

| | | | |
|---|---|---|---|
| 2,371,897 | 3/45 | Knick | 178—7.5 |
| 3,109,891 | 11/63 | Molzahn | 315—22 X |

DAVID G. REDINBAUGH, *Primary Examiner.*